United States Patent [19]

Miller et al.

[11] Patent Number: 5,843,222
[45] Date of Patent: *Dec. 1, 1998

[54] MODIFIED CEMENT AND CONCRETE COMPOSITIONS

[75] Inventors: F. MacGregor Miller, Gurnee, Ill.;
Timothy Jay Roth, Allentown, Pa.;
William Russell Welliver, Ship Bottom, N.J.

[73] Assignee: Air Products and Chemicals, Inc., Allentown, Pa.

[*] Notice: The term of this patent shall not extend beyond the expiration date of Pat. No. 5,562,767.

[21] Appl. No.: 938,185

[22] Filed: Sep. 26, 1997

Related U.S. Application Data

[63] Continuation of Ser. No. 562,721, Feb. 14, 1996, abandoned.
[51] Int. Cl.$^6$ .................................................... C04B 18/06
[52] U.S. Cl. ...................... 108/608; 106/624; 106/634; 106/668; 106/671; 106/705; 106/736; 106/801; 106/802; 106/815; 106/823; 106/DIG. 7
[58] Field of Search .................................. 106/736, 801, 106/815, 802, 705, DIG. 7, 668, 608, 624, 634, 671

[56] References Cited

U.S. PATENT DOCUMENTS

| | | | |
|---|---|---|---|
| 3,847,635 | 11/1974 | Lange et al. | 106/110 |
| 4,462,840 | 7/1984 | Schilling et al. | 106/277 |
| 4,795,478 | 1/1989 | Layrisse et al. | 44/51 |
| 4,923,483 | 5/1990 | Layrisse et al. | 44/51 |
| 5,562,767 | 10/1996 | Miller et al. | 106/668 |

FOREIGN PATENT DOCUMENTS

| | | |
|---|---|---|
| 59-105882 | 10/1984 | Japan . |
| 01141853 | 9/1989 | Japan . |

*Primary Examiner*—Paul Marcantoni
*Attorney, Agent, or Firm*—William F. Marsh

[57] ABSTRACT

A cementitious composition comprising 0.1 to about 7.5 percent by weight of a solid residual oxidation product from the combustion of an aqueous emulsion of a naturally occurring asphalt from the Orinoco Belt of Venezuela which contains from about 100 to about 1500 ppm by weight of magnesium in the form of a water soluble magnesium salt, which product from the combustion contains magnesium sulfate present in the amount of from about 0.05 to about 4 percent by weight of the cementitious composition and from about 92.5 to about 99.95 percent by weight of a hydraulic silicate cement material.

24 Claims, 2 Drawing Sheets

FIG.2

MODIFIED CEMENT AND CONCRETE COMPOSITIONS

This is a continuation of application Ser. No. 08/562,721 filed 14 Feb., 1996 now abandoned.

BACKGROUND OF THE INVENTION

This invention relates generally to improvement of the engineering properties for hydraulic cements, mortars and/or concretes and, more particularly, to such compositions having incorporated therein one of several property and/or performance modifying additives.

It is well known in the cement/concrete industry that cementitious materials are prepared by combining the sintered-product of the oxides of calcium, silicon, iron and aluminum (commonly abbreviated C, S, F and A, respectively, in the industry) with a calcium sulfate material. Subsequent addition of water to the cement provides a workable material which hardens and gains strength as hydration proceeds to completion. Varying the proportions of the initial oxide and sulfate materials and the process conditions affects the physical properties and performance of the resulting mortar or concrete. More specifically, these properties and subsequent performance are, in large part, determined by the relative amounts of, interaction between and hydration of the sintered oxide products: tricalcium silicate, dicalcium silicate, tricalcium aluminate and tetra-calcium aluminoferrite (abbreviated $C_3S$, $C_2S$, $C_3A$ and $C_4AF$, respectively, in the industry). Generally, $C_3S$ contributes to early and later compressive strengths, while the contribution of $C_2S$ is limited to later strengths. $C_3A$ contributes to early strength, but is sulfate susceptible. While $C_4AF$ is also sulfate susceptible and adds little to early strength, it does enhance later strength. It is understood that while these four oxides and their products of sintering are those basic to the preparation and function of cementitious materials, other chemical components will also be present depending upon the source and/or identity of the raw materials used.

As mentioned above, the sintered product, clinker, is finely ground with an appropriate amount of a calcium sulfate material, usually gypsum. The resulting mixture is a hydraulic cementitious material, of which portland cement is a well-known representative. The principle function of the sulfate material is to control the rate of hydration and set time of the cement. The development of and ultimate strength of any cement/concrete is due, in large part, to hydration of the clinker and the rate of this series of complex chemical reactions.

The introduction of extraneous substances, additives, and/or components is done with the risk of intefering with cement chemistry and adversely affecting the development of, and overall, compressive strength. For instance, the identity and amount of any admixture used, while designed to modify one property, may simultaneously and/or adversely affect another property such as water requirement, air content, rate of hardening, bleeding and strength. Even relatively small quantities of such extraneous substances, whether interground or admixed, can disrupt the chemistry and result in a cement/concrete having chemical, physical and/or performance properties falling outside the desired or anticipated specifications.

It is desirable, therefore, to provide an inexpensive additive which can be incorporated into cement/concrete to improve the properties thereof. It is particularly desirable that such an additive can be incorporated either by admixing or by intergrinding. It is also desirable to provide such cement and concrete compositions having comparable or enhanced chemical, physical and/or performance properties recognized through out the industry, both here and abroad, especially as they apply to the portland cements as specified under various ASTM, B.S., DIN and equivalent standard specifications.

SUMMARY OF THE INVENTION

This invention relates to a cementitious composition, which can be employed in the production of cement and/or concrete, and which composition comprises a mixture of from about 0.05 to about 4 per cent by weight of magnesium sulfate and from about 92.5 to about 99.95 per cent by weight of a hydraulic silicate cement material, including slag cements, blended cements, and portland-based cement materials. The cement material can be any of the types well known in the industry, such as, for example those described in ASTM Standards C 150 and C 595 and equivalent standards throughout the world.

Generally, the magnesium sulfate can be present in the cementitious composition in concentrations of about 0.1 per cent by weight or greater, such as, for example about 0.2 or 0.4 percent by weight. While concentrations of up to about 4 per cent by weight have been found operable, lesser quantities, such as, for example about 3 per cent by weight and even about 2 or 1 per cent by weight are quite effective.

One particularly economical source of magnesium sulfate that has been found effective is the solid oxidation product from oxidizing a mixture comprising carbon (particularly a hydrocarbon), sulfur and magnesium with the sulfur and magnesium in a molar ratio of sulfur to magnesium in the range of from about 1 to about 200, preferably at least about 10 or even about 25. Generally, it is not necessary to have a ratio of greater than about 100, or even about 50. Usually the combined sulfur and magnesium content of the mixture comprising carbon, sulfur and magnesium which is oxidized is in the range of from about 1 to about 5 per cent by weight of the mixture comprising carbon, sulfur and magnesium which is oxidized and can be from as low as about 0.05 or 0.5 up to as high as 6 or 7 per cent by weight. The magnesium component in the oxidation product, magnesium sulfate, is generally present in a weight ratio to unoxidized carbon of greater than about 5, and preferably greater than about 20, or even about 50.

Such oxidation products generally have a magnesium content, measured as elemental magnesium, of about 4 to about 12 per cent by weight, preferably about 8 to about 11 per cent by weight. Usually, the unoxidized carbon in the oxidation product is less than about 4 per cent by weight and preferably lower, for example 2 or even 1 per cent by weight. It will be understood that the lower unoxidized carbon content in the oxidation product is desired and zero is ideal. Typically the molar ratio of sulfur to magnesium in the oxidation product is less than about 10 and generally is in the range of from about 1 to about 5, or of from about 1 to about 2. To express it in another manner, the oxidation product has a magnesium sulfate to unoxidized carbon molar ratio of greater than about 5, preferably greater than about 20 and even greater than about 50.

It is particularly preferred to employ as the mixture comprising carbon, sulfur and magnesium which is oxidized an aqueous emulsion of naturally occurring asphalt from the Orinoco Belt of Venezuela containing from about 100 to about 1500 ppm by weight of magnesium in the form of a water soluble magnesium salt as the mixture comprising carbon, sulfur and magnesium which is oxidized. When employing such a material as the mixture comprising carbon, sulfur and magnesium which is oxidized, the oxidation product can be incorporated as an additive, whether interground or admixed, over a range of concentrations, for use in the preparation of a variety of cement, mortar and concrete compositions, and the like. Typically the oxidation product can be incorporated into the cement material in quantities in the range of from about 0.1 to about 7.5 or 8 percent by weight based upon the overall composition.

Another source of magnesium sulfate that can be employed in this invention comprises a mixture of the halides, hydroxides, carbonates and sulfates of Group IA and IIA metals. Mixtures such as these can be conveniently obtained from the waste solids produced in the aqueous scrubbing of flue gases. These mixtures should be limited in the amount employed due to the fact that they contain significant quantities of halides, particularly chlorides. Accordingly, we find that limiting the concentration of such mixtures to about 40 per cent by weight of the total mineral additive or mineral admixture employed in producing the final cementitious composition is desirable. This is equivalent to about 1 per cent by weight of the total cementitious composition. Such upper limits for the IA and IIA mixtures keeps the halide level in the final cementitious composition below that set by various specifications and standards. Preferably, these mixtures are limited to about 20 per cent by weight of the mineral admixture or about 0.5 per cent by weight of the final cementitious composition. The lower limit is set by the quantity of magnesium it is desired to include in the cementitious composition. Typically, we tend to employ these mixtures at a level of at least about 10 per cent by weight of the mineral admixture or about 0.25 per cent by weight of the final cementitious composition. It will be understood that these mixtures can be used alone or in conjunction with other sources of magnesium sulfate, such as the oxidation products mentioned above or magnesium sulfate, per se.

In part, the present invention is a cementitious composition including (1) from about 0.1 to 7.5 percent by weight of a solid oxidation product of an aqueous emulsion of a naturally occurring asphalt from the Orinoco Belt of Venezuela which aqueous emulsion contains from about 100 to about 1500 ppm by weight of magnesium in the form of a water soluble magnesium salt, and (2) from about 92.5 to about 99.9 percent by weight of a hydraulic silicate cement material. In preferred embodiments, the oxidation product is obtained from the combustion of commercially-available Orimulsiong® fuel and, alternatively, is utilized in the range from about 0.5 to about 5.0 percent by weight. Reference to silicate cement materials also includes those materials comprising various calcium aluminates and aluminoferrites.

As described above, the inventive cement and/or concrete compositions have incorporated therein an oxidation product of an aqueous emulsion of a naturally occurring asphalt from the Orinoco Belt of Venezuela which contains magnesium. Generally and as will be well known to those skilled in the art made aware of the invention, the preparation of such an oxidation product includes contacting the asphalt material with air and/or another oxygen-containing stream, through any one of several recognized processes or variations thereof, to provide oxidation product in addition to combustion by-products such as heat, carbon dioxide and water. The oxidation product is the solid residual subsequently collected downstream from the point of combustion/oxidation.

The oxidation product of the present invention can be generated in such a manner as to include the introduction of one of several auxiliary processes and/or additives upstream, downstream or at the point of combustion, to meet various process or combustion requirements, relating but not limited to emission control, reduced corrosion or enhanced operability. Depending upon the nature of these processes and/or additives, the combustion residue or by-products thereof can become intimately co-mingled with an oxidation product described above and can be, where appropriate, considered part of, integral to and used with the present invention.

Illustrative of an auxiliary process and/or additive is the incorporation of a flue gas clean up device—such as a wet lime-limestone scrubber—downstream from the combuster. Scrubber residues can be returned and/or reintroduced to the combustion/oxidation line at a point upstream of the final particulate separator, such that the residues are mixed with and incorporated into the oxidation product. Again, considering a scrubber process as illustrative of a number of available auxiliary processes, one skilled in the art will recognize that the identity/composition of the scrubber residues are a function of the identity of the particular scrubbing reagent, whether it be lime, limestone or a related scrubbing reagent, and the compositional components and their relative concentrations of the make-up water used in the scrubber.

An asphaltic precursor to the oxidation products of this invention and which contains the requisite amount of magnesium is commercially available from Bitor America Corporation, Boca Raton, Florida, under the Orimulsion® trademark. Without limitation, this commercial product can be prepared by initial injection of steam into the asphalt formation until the viscosity is reduced to a point permitting it to flow into a well bore. A primary aqueous emulsion is prepared which further reduces asphalt viscosity and facilitates handling and transportation. The primary emulsion is then broken with the water substantially removed, leaving an asphalt material with less than 2% water.

Alternatively, the asphalt in the formation can be dissolved or suspended in a light hydocarbon solvent, such as for example, kerosene, and the kerosene-containing bitumen removed to the surface where separation of the bitumen and kerosene can be effected.

Fresh water is then introduced or reintroduced and the asphalt is emulsified with a surfactant under strictly controlled protocols. For example, for a shear rate of 20 $s^{-1}$, a viscosity of about 450 mPa is achieved by handling the Orimulsionl® at 30° C. This and comparable production methods and techniques provide an aqueous emulsion with no more than 2% of the droplets having a diameter higher than 80 micrometers. The Orimulsion® material is further characterized by density (~1,010 $Kg/m^3$ at 15° C.), flash point (~130° C./266° F.), and concentrations of vanadium (~300 ppm), nickel (~73 ppm), magnesium (~350 ppm), carbon (~60.0 weight percent), hydrogen (~7.5 weight percent), sulftir (~2.7 weight percent), nitrogen (~0.50 weight percent) and oxygen (~0.20 weight percent).

It will be understood by those skilled in the art that the compositions and/or methods of the present invention are not necessarily restricted by incorporation of an oxidation product of any one aqueous emulsion of the type profiled above. Whereas a commercially-available Orinoco asphalt material might be described as a 30% aqueous emulsion prepared with a nonionic surfactant, the compositions of the present invention can suitably comprise, consist of or consist essentially of the oxidation product of such material and/or oxidation products of other comparably emulsified Orinoco-type asphalts, so long as such materials contain the requisite amount of magnesium—usually added as a water soluble salt. Each such oxidation product is compositionally distinguishable, characteristically contrasted and can be practiced in conjunction with the present invention separate and apart from another. Accordingly, it should be understood that the inventive compositions, illustratively disclosed herein, can be prepared and/or practiced in the absence of any one oxidation product and/or species which may or may not be specifically disclosed, referenced or inferred herein, the absence of which may or may not be specifically disclosed, referenced or inferred herein.

While other components, preparations, mixtures or formulations involving a naturally occurring Orinoco-type asphalt can be used herewith, a useful source of oxidation product is available under the PCS trademark, available from Pure Air, a division of Air Products and Chemicals, Inc. of Allentown, Pa. As described above, the compositional profile of an oxidation product will reflect any process, operation and/or additive auxiliary to the asphalt and/or combustion process. However, any such oxidation product—while compositionally distinguishable, characteristically contrasted, and separately practiced—will reflect either the absolute or relative vanadium and nickel concentrations characteristic of a naturally occurring asphalt from the Orinoco Belt of Venezuela.

While various embodiments of the present invention are described as having incorporated therein an amount of oxidation product falling within a particular weight percent range, it should be understood that this invention is not limited by such constraints. Other amounts or concentrations can be utilized. While the resulting cement, mortar or concrete compositions may not have imparted thereto the same degree of beneficial effects or meet various standard specifications, they can nonetheless be utilized.

While various hydraulic silicate cement materials can be used to prepare the cementitious composition of this invention, portland cements have been used with good effect. The chemical and physical parameters of various portland cements which can be used in conjunction with the present invention are as provided in American Society for Testing and Materials (ASTM) standard specification C 150. In particular, those cement materials having the physical and chemical properties meeting or equivalent to ASTM C 150 standard specifications for Type I, Type II and Type V portland cements are preferred.

The pertinent chemical and physical parameters are as provided in Tables A-D, below. ASTM standard C 150 and C 595 and C 1157, as described below, also include specifications for the aforementioned portland cements and blended cements interground with an air-entraining agent, and such cement materials are also included within the scope of this invention. Likewise, the cement and/or concrete materials of this invention can further include an interground functional addition material and/or a chemical admixture of the type specified in ASTM standard specifications C 688 and C 494, respectively, both of which are incorporated herein in their entirety by reference. Such functional addition materials are those which are interground with clinker during manufacture/preparation of the cement and/or concrete and include, without limitation, accelerating addition, retarding addition, water-reducing addition, water-reducing and accelerating addition, and water-reducing, retarding addition materials, and set-control addition.

Similar and/or equivalent materials can be used as chemical admixtures added to portland cement/concrete mixtures in the field. Preferred chemical admixtures include naphthalene sulfonate and the various melamines, representative of a group of compositions commonly known as superplasticizers. Such admixtures, as well as others referenced or inferred in ASTM standard C 494 and similar or comparable functional additions as reference in ASTM standard C 688, can be added in amounts sufficient to beneficially modify one or more particular properties of the cement/concrete material. The amounts interground or admixed will vary, according to this invention, with the concentration of oxidation product.

TABLE A

ASTM C 150 Standard Chemical Requirements

| Cement Type | I and IA | II and IIA | III and IIIA | IV | V |
|---|---|---|---|---|---|
| Silicon dioxide ($SiO_2$), min, % | — | 20.0 | — | — | — |
| Aluminum oxide ($Al_2O_3$), max, % | — | 6.0 | — | — | — |
| Ferric oxide ($Fe_2O_3$), max, % | — | 6.0 | — | 6.5 | — |
| Magnesium oxide (MgO), max, % | 6.0 | 6.0 | 6.0 | 6.0 | 6.0 |
| Sulfur trioxide ($SO_3$), max, % | | | | | |
| When ($C_3A$) is 8% or less | 3.0 | 3.0 | 3.5 | 2.3 | 2.3 |
| When ($C_3A$) is more than 8% | 3.5 | N/A | 4.5 | N/A | N/A |
| Loss on ignition, max, % | 3.0 | 3.0 | 3.0 | 2.5 | 3.0 |
| Insoluble residue, max, % | 0.75 | 0.75 | 0.75 | 0.75 | 0.75 |
| Tricalcium silicate ($C_3S$) max, % | — | — | — | 35 | — |
| Dicalcium silicate ($C_2S$) min, % | — | — | — | 40 | — |
| Tricalcium aluminate ($C_3A$) max, % | — | 8 | 15 | 7 | 5 |
| Tetracalcium aluminoferrite plus twice the tricalcium aluminate ($C_4AF + 2(C_3A)$), or solid solution ($C_4AF + C_2F$), as applicable, max, % | — | — | — | — | 25 |

When expressing compounds, C=CaO, S=$SiO_2$, A=$Al_2O_3$, F=$Fe_2O_3$. For example, $C_3A = 3CaO \cdot Al_2O_3$.

There are cases where optimum $SO_3$ (using Test Method C 563) for a particular cement is close to or in excess of the limit in this specification. In such cases where properties of a cement can be improved by exceeding the $SO_3$ limits stated in this table, it is permissible to exceed the values in the table, provided it has been demonstrated by Test Method C 1038 that the cement with the increased $SO_3$ will not develop expansion in water exceeding 0.020% at 14 days. When the manufacturer supplies cement under this provision, he shall, upon request, supply supporting data to the purchaser.

The expression of chemical limitations by means of calculated assumed compounds does not necessarily mean that the oxides are actually or entirely present as such compounds.

Titanium dioxide and phosphorus pentoxide ($TiO_2$ and $P_2O_5$) shall be included with the $Al_2O_3$ content. The value historically and traditionally used for $Al_2O_3$ in calculating potential compounds for specification purposes is the ammonium hydroxide group minus ferric oxide ($R_2O_3$–$Fe_2O_3$) as obtained by classical wet chemical methods. This procedure includes as $Al_2O_3$ the $TiO_2$, $P_2O_5$ and other trace oxides which precipitate with the ammonium hydroxide group in the classical wet chemical methods. Many modern instrumental methods of cement analysis determine aluminum or aluminum oxide directly without the minor and trace oxides included by the classical method. Consequently, for consistency and to provide comparability with historic data and among various analytical methods, when calculating potential compounds for specification purposes, those using methods which determine Al or $Al_2O_3$ directly should add to the determined $Al_2O_3$ weight quantities of $P_2O_5$, $TiO_2$ and any other oxide except $Fe_2O_3$ which would precipitate with the ammonium hydroxide group when analyzed by the classical method and which is present in an amount of 0.05 weight percent or greater. The weight percent of minor or trace oxides to be added to $Al_2O_3$ by those using direct methods may be obtained by actual analysis of those oxides in the sample being tested or estimated from historical data on those oxides on cements from the same source, provided that the estimated values are identified as such.

When the ratio of percentages of aluminum oxide to ferric oxide is 0.64 or more, the percentages of tricalcium silicate, dicalcium silicate, tricalcium aluminate, and tetracalcium aluminoferrite shall be calculated from the chemical analysis as follows:

Tricalcium silicate = $(4.071 \times \% \text{ CaO}) - (7.600 \times \% \text{ SiO}_2) - 6.718 \times \% \text{ Al}_2\text{O}_3) - 1.430 \times \% \text{ Fe}_2\text{O}_3) - 2.852 \times \% \text{ SO}_3)$
Dicalcium silicate = $(2.867 \times \% \text{ SiO}_2) - (0.7544 \times \% \text{ C}_3\text{S})$
Tricalcium aluminate = $(2.650 \times \% \text{ Al}_2\text{O}_3) - (1.692 \times \% \text{ Fe}_2\text{O}_3)$
Tetracalcium aluminoferrite = $3.043 \times \% \text{ Fe}_2\text{O}_3$ When the alumina-ferric oxide ratio is less than 0.64, a calcium aluminoferrite solid solution (expressed as ss($C_4AF+C_2F$) is formed. Contents of this solid solution and of tricalcium silicate shall be calculated by the following formulas:

ss($C_4AF + C_2F$) = $(2.100 \times \% \text{ Al}_2\text{O}_3) + (1.702 \times \% \text{ Fe}_2\text{O}_3)$
Tricalcium silicate = $(4.071 \times \% \text{ CaO}) - (7.600 \times \% \text{ SiO}_2) - (4.479 \times \% \text{ Al}_2\text{O}_3) - (2.859 \times \% \text{ Fe}_2\text{O}_3) - (2.852 \times \% \text{ SO}_3)$.
No tricalcium aluminate will be present in cements of this composition.
Dicalcium silicate shall be calculated as previously shown.
In the calculation of all compounds the oxides determined to the nearest 0.1% shall be used.
All values calculated as described in this note shall be reported to the nearest 1%.

For Type IV cements, $C_3S$, $C_2S$ and $C_2A$ requirements do not apply when the heat of hydration limit on Table D is specified.

For Type V cements, $C_3A$ and ($C_4AF+2(C_3A)$) requirements do not apply when the sulfate expansion limit in Table D is specified.

TABLE B

| | ASTM C 150 Optional Chemical Requirements | | | | | |
|---|---|---|---|---|---|---|
| Cement Type | I and IA | II and IIA | III and IIIA | IV | V | Remarks |
| Tricalcium aluminate ($C_3A$), max, % | — | — | 8 | — | — | for moderate sulfate resistance |
| Tricalcium aluminate ($C_3A$), max, % | — | — | 5 | — | — | for high sulfate resistance |
| Sum of tricalcium silicate and tricalcium aluminate, max, % | — | 58 | — | — | — | for moderate heat of hydration |
| Alkalies ($Na_2O + 0.658K_2O$), max, % | 0.60 | 0.60 | 0.60 | 0.60 | 0.60 | low-alkali cement |

When expressing compounds, C=CaO, S=$SiO_2$, A=$Al_2O_3$, F=$Fe_2O_3$. For example, $C_3A$=3CaO·$Al_2O_3$.

These optional requirements apply only if specifically requested. Availability should be verified. See note in Section 4.

The expression of chemical limitations by means of calculated assumed compounds does not necessarily mean that the oxides are actually or entirely present as such compounds.

When the ratio of percentages of aluminum oxide to ferric oxide is 0.64 or more, the percentages of tricalcium silicate, dicalcium silicate, tricalcium aluminate and tetracalcium aluminoferrite shall be calculated from the chemical analysis as follows:

Tricalcium silicate = (4.071 × % CaO) − (7.600 × % SiO$_2$) − (6.718 × % Al$_2$O$_3$) − (1.430 × % Fe$_2$O$_3$) − (2.852 × % SO$_3$)
Dicalcium silicate = (2.867 × % SiO$_2$) − (0.7544 % C$_3$S)
Tricalcium aluminate = (2.650 × % Al$_2$O$_3$) − (1.692 × % Fe$_2$O$_3$)
Tetracalcium aluminoferrite = 3.043 × % Fe$_2$O$_3$ When the alumina-ferric oxide ratio is less than 0.64, a calcium aluminoferrite solid solution (expressed as ss (C$_4$AF+C$_2$F)) is formed. Contents of this solid solution and of tricalcium silicate shall be calculated by the following formulas:

ss(C$_4$AF + C$_2$F) = (2.100 × % Al$_2$O$_3$) + (1.702 × % Fe$_2$O$_3$)
Tricalcium silicate = (4.071 × % CaO) − (7.600 × % SiO$_2$) − (4.479 × % Al$_2$O$_3$) − (2.859 × % Fe$_2$O$_3$) − (2.852 × % SO$_3$).
No tricalcium aluminate will be present in cements of this composition.
Dicalcium silicate shall be calculated as previously shown.
In the calculation of all compounds the oxides determined to the nearest 0.1% shall be used.
All values calculated as described in this note shall be reported to the nearest 1%.

The optional limit of heat of hydration in Table D shall not be requested when the sum of C$_3$S and C$_3$A is requested.

The limit on alkalies may be specified when the cement is to be used in concrete with aggregates that may be deleteriously reactive. Reference should be made to Specification C 33 for suitable criteria of deleterious reactivity.

TABLE C

| ASTM C 150 Standard Physical Requirements | | | | |
|---|---|---|---|---|
| Cement Type | I | IA | II | IIA |
| Air content of mortar, volume %: | | | | |
| max | 12 | 22 | 12 | 22 |
| min | — | 16 | — | 16 |
| Fineness, specific surface, m$^2$/kg (alternative methods): | | | | |
| Turbidimeter test, min | 160 | 160 | 160 | 260 |
| Air permeability test, min | 280 | 280 | 280 | 280 |
| Autoclave expansion, max, % | 0.80 | 0.80 | 0.80 | 0.80 |
| Strength; not less than the values shown for the ages indicated below: | | | | |
| Compressive strength, psi (MPa): | | | | |
| 1 day | — | — | — | — |
| 3 day | 1800 (12.4) | 1450 (10.0) | 1500 (10.3) 1000 (6.9) | 1200 (8.3) 800 (5.5) |
| 7 days | 2800 (19.3) | 2250 (15.5) | 2500 (17.2) 1700 (11.7) | 2000 (13.8) 1350 (9.3) |
| 28 days | — | — | — | — |
| Time of setting (alternative methods): | | | | |
| Gillmore test: | | | | |
| Initial set, min, not less than | 60 | 60 | 60 | 60 |
| Final set, min, not less than | 600 | 600 | 600 | 600 |
| Vicat test: | | | | |
| Time of setting, min, not less than | 45 | 45 | 45 | 45 |
| Time of setting, min, not more than | 375 | 375 | 375 | 375 |
| Cement Type | III | IIIA | IV | V |
| Air content of mortar, volume %: | | | | |
| max | 12 | 22 | 12 | 12 |
| min | — | 16 | — | — |
| Fineness, specific surface, m$^2$/kg (alternative methods): | | | | |
| Turbidimeter test, min | — | — | 160 | 160 |
| Air permeability test, min | — | — | 280 | 280 |
| Autoclave expansion, max, % | 0.80 | 0.80 | 0.80 | 0.80 |

TABLE C-continued

ASTM C 150 Standard Physical Requirements

Strength; not less than the values shown for the ages indicated below:

Compressive strength, psi (MPa):

| | | | | |
|---|---|---|---|---|
| 1 day | 1800 (12.4) | 1450 (10.0) | — | — |
| 3 day | 3500 (24.1) | 2800 (19.3) | — | 1200 (8.3) |
| 7 days | — | — | 1000 (6.9) | 2200 (15.2) |
| 28 days | — | — | 2500 (17.2) | 3000 (20.7) |

Time of setting (alternative methods):

Gillmore test:

| | | | | |
|---|---|---|---|---|
| Initial set, min, not less than | 60 | 60 | 60 | 60 |
| Final set, min, not less than | 600 | 600 | 600 | 600 |

Vicat test:

| | | | | |
|---|---|---|---|---|
| Time of setting, min, not less than | 45 | 45 | 45 | 45 |
| Time of setting, min, not more than | 375 | 375 | 375 | 375 |

Compliance with requirements of this specification does not necessarily ensure that the desired air content will be obtained in concrete.

Either of the two alternative fineness methods may be used at the option of the testing laboratory. However, when the sample fails to meet the requirements of the air-permeability test, the turbidimeter test shall be used, and the requirements in this table for the turbidimetric method shall govern.

The strength at any specified test age shall not be less than that attained at any previous specified test age.

The purchaser should specify the type of setting-time test required. In case he does not so specify, the requirements of the Vicat test only shall govern.

The second set of 3- and 7-day strength parameters for Types II and IIA apply when the optional heat of hydration or the chemical limit on the sum of the tricalcium silicate tricalcium aluminate aluminate is specified.

The time of setting is that described as initial setting time in Test Method C 191.

TABLE D

ASTM C 150 Optional Physical Requirements

| Cement Type | I | IA | II | IIA |
|---|---|---|---|---|
| False set, final penetration, min, % | 50 | 50 | 50 | 50 |
| Heat of hydration: | | | | |
| 7 days, max, cal/g (kJ/kg) | — | — | 70(290) | 70(290) |
| 28 days, max, cal/g (kJ/kg) | — | — | — | — |
| Strength, not less than the values shown: | | | | |
| Compressive strength, psi (MPa) | | | | |
| 28 days | 4000 (27.6) | 3200 (22.1) | 4000 (27.6) 3200 (22.1) | 3200 (22.1) 2560 (17.7) |
| Sulfate expansion, 14 days, max, % | — | — | — | — |

| Cement Type | III | IIIA | IV | V |
|---|---|---|---|---|
| False set, final penetration, min, % | 50 | 50 | 50 | 50 |
| Heat of hydration: | | | | |
| 7 days, max, cal/g (kJ/kg) | — | — | 60 (250) | — |
| 28 days, max, cal/g (kJ/kg) | — | — | 70 (290) | — |

TABLE D-continued

ASTM C 150 Optional Physical Requirements

Strength, not less than the values shown:

Compressive strength, psi (MPa)

| | | | | |
|---|---|---|---|---|
| 28 days | — | — | — | — |
| Sulfate expansion, 14 days, max, % | — | — | — | 0.040 |

The optional limit for the sum of the tricalcium silicate and tricalcium aluminate shall not be requested when the heat of hydration limit is requested for Types II and IIA. These strength requirements apply when either heat of hydration or the sum of tricalcium silicate and tricalcium aluminate requirements are requested.

When the heat of hydration limit is specified for Type IV cement, it shall be instead of the limits of $C_3S$, $C_2S$, and $C_3A$ listed in Table A.

When the sulfate expansion is specified, it shall be instead of the limits of $C_3A$ and $C_4AF+2\ C_3A$ listed in Table A.

In part, the present invention contemplates the oxidation product as interground with the hydraulic cement material. It should be also understood that the oxidation product can also be utilized as an admixture to the cement material. In the latter situation, the cement material preferably has chemical and physical properties as specified in ASTM C 150 for Type I portland cement and C 595 and C 1157 for blended cements and the oxidation product is present in the range of about 1.0 to 3.0 percent by weight. Alternatively, in additional preferred admixture embodiments, the cement material has chemical and physical properties as specified in ASTM C 150 for Type V portland cement and C 595 and C 1157 for blended cements and the oxidation product is present in the range of about 1.0 to about 5.0 percent by weight.

As discussed above, various portland cements can be used to prepare the composition of this invention. Also as discussed above, in addition to the Types of portland cement, those cement materials having the chemical and physical properties meeting or equivalent to ASTM C 595 standard specifications for blended hydraulic cements can also be used. The pertinent chemical and physical parameters are as provided in Tables E-G, below. Likewise, the inventive oxidation product can be used with the various blended hydraulic cements meeting the performance requirements provided in ASTM standard specification C 1157, regardless of the composition of the cement material or its constituents. Specification C 1157 classifies cements by type based on specific requirement for general use, high early strength, resistance to attack by sulfates and heats of hydration. Optional requirements are provided for the property of low reactivity with alkali-reactive aggregates. Standard specification C 1157, *Annual Book of ASTM Standards*, Vol. 4.02, is incorporated in its entirety herein by reference.

TABLE E

ASTM C 595 Chemical Requirements

| Cement Type | I(SM), I(SM)-A, IS, IS A | S, SA | I(PM), I(PM)-A, P, PA, IP, IP-A |
|---|---|---|---|
| Magnesium oxide (MgO), max, % | — | — | 5.0 |
| Sulfur reported as sulfate ($SO_3$), max, % | 3.0 | 4.0 | 4.0 |
| Sulfide sulfur (S), max, % | 2.0 | 2.0 | — |
| Insoluble residue, max, % | 1.0 | 1.0 | — |
| Loss on ignition, max, % | 3.0 | 4.0 | 5.0 |
| Water-soluble alkali, max, % | — | 0.03 | — |

When it has been demonstrated by Test Method C 563 that the optimum $SO_3$ exceeds a value of 0.5% less than the specification limit, an additional amount of $SO_3$ is permissible provided that, when the cement with the additional calcium sulfate is tested by Test Method C 265, the calcium sulfate in the hydrated mortar at 24±¼ h, expressed as $SO_3$, does not exceed 0.50 g/L. When the manufacturer supplies cement under this provision, he will, upon request, supply supporting data to the purchaser.

TABLE F

ASTM C 595 Physical Requirements

| Cement Type | I(SM), IS, I(PM), IP | I(SM)-A, IS-A, I(PM)-A, IP-A | IS(MS) IP(MS) | IS-A(MS) IP-A(MS) |
|---|---|---|---|---|
| Fineness | | (See below) | | |
| Autoclave expansion max, % | 0.50 | 0.50 | 0.50 | 0.50 |
| Autoclave contraction, max % | 0.20 | 0.20 | 0.20 | 0.20 |
| Time of setting, Vicat test: | | | | |
| Set, minutes, not less than | 45 | 45 | 45 | 45 |

TABLE F-continued

ASTM C 595 Physical Requirements

| Cement Type | I(SM), IS, I(PM), IP | I(SM)-A, IS-A, I(PM)-A, IP-A | IS(MS) IP(MS) | IS-A(MS) IP-A(MS) |
|---|---|---|---|---|
| Set, h, not more than | 7 | 7 | 7 | 7 |
| Air content of mortar (Method C 185), volume % | 12 max | 19 ± 3 | 12 max | 19 ± 3 |
| Compressive strength, min, psi (MPa): | | | | |
| 3 days | 1800 (12.4) | 1450 (9.9) | 1500 (10.3) | 1200 (8.3) |
| 7 days | 2800 (19.3) | 2250 (15.5) | 2500 (17.2) | 2000 (13.8) |
| 28 days | 3500 (24.1) | 2800 (19.3) | 3500 (24.1) | 2800 (19.3) |
| Heat of hydration: | | | | |
| 7 days, max, cal/g (kJ/kg) | 70 (293) | 70 (293) | 70 (293) | 70 (293) |
| 28 days, max, cal/g (kJ/kg) | 80 (335) | 80 (335) | 80 (335) | 80 (335) |
| Water requirement, max weight % of cement | — | — | — | — |
| Drying shrinkage, max, % | — | — | — | — |
| Mortar expansion: | | | | |
| At age of 14 days, max, % | 0.020 | 0.020 | 0.020 | 0.020 |
| At age if 8 weeks, max, % | 0.060 | 0.060 | 0.060 | 0.060 |
| Sulfate Resistance | | | | |
| Expansion at 180 days max, % | | | 0.10 | 0.10 |

When it has been demonstrated by Test Method C 563 that the optimum $SO_3$ exceeds a value of 0.5% less than the specification limit, an additional amount of $SO_3$ is permissible provided that, when the cement with the additional calcium sulfate is tested by Test Method C 265, the calcium sulfate in the hydrated mortar at 24±¼ h, expressed as $SO_3$, does not exceed 0.50 g/L. When the manufacturer supplies cement under this provision, he will, upon request, supply supporting data to the purchaser.

TABLE G

ASTM C 595 Physical Requirements

| Cement Type | I(SM), IS, I(PM), IP | I(SM)-A, IS-A, I(PM)-A, IP-A | IS(MS) IP(MS) | IS-A(MS) IP-A(MS) |
|---|---|---|---|---|
| Fineness | | (See below) | | |
| Autoclave expansion max, % | 0.50 | 0.50 | 0.50 | 0.50 |
| Autoclave contraction, max % | 0.20 | 0.20 | 0.20 | 0.20 |
| Time of setting, Vicat test: | | | | |
| Set, minutes, not less than | 45 | 45 | 45 | 45 |
| Set, h, not more than | 7 | 7 | 7 | 7 |
| Air content of mortar (Method C 185), volume % | 12 max | 19 ± 3 | 12 max | 19 ± 3 |
| Compressive strength, min, psi (MPa): | | | | |
| 3 days | 1800 (12.4) | 1450 (9.9) | 1500 (10.3) | 1200 (8.3) |
| 7 days | 2800 (19.3) | 2250 (15.5) | 2500 (17.2) | 2000 (13.8) |
| 28 days | 3500 (24.1) | 2800 (19.3) | 3500 (24.1) | 2800 (19.3) |
| Heat of hydration: | | | | |
| 7 days, max, cal/g (kJ/kg) | 70 (293) | 70 (293) | 70 (293) | 70 (293) |

Alternative embodiments of this invention, as compared to those discussed above, include a hydraulic silicate cement material having chemical and physical properties specified in ASTM C 595 and/or 1157 standard specification. Such embodiments can include an oxidation product derived from the Orimulsionl® fuel, described above. Irrespective of the derivation of the oxidation product, it is preferably present in the range of about 1.0 to 3.0 percent by weight when used in conjunction with a Type IP portland-pozzolan cement, as specified under ASTM C 595.

In part, the present invention also includes hydrated cementitious concrete compositions, which include (1) a hydraulic silicate cement material, (2) a solid oxidation product of an aqueous emulsion of a naturally occurring asphalt from the Orinoco Belt of Venezuela, such oxidation product containing the requisite amount of magnesium and present in the range from about 0.1 to about 7.5 percent by weight of the cement material, (3) an aggregate material, and (4) water in an amount sufficient to hydrate the composition. It should be understood that the water component in this composition may be somewhat less than or somewhat greater than the amount required to effect complete chemical hydration. As discussed more fully above, the oxidation product is preferentially obtained from the commercially available Orimulsion® fuel and, alternatively, present within such compositions in the range from about 1.0 to about 5.0 percent by weight. Likewise, the hydraulic cement materials are preferentially chosen from those cement materials having chemical and physical properties meeting or equivalent to the ASTM C 150 standard specifications for Type I, Type II and Type V portland cement and/or blended cement material having chemical and physical properties meeting and/or equivalent to ASTM standard specifications C 595 and/or C 1157.

As known to those with skill in the art, aggregates for concrete are primarily comprised of sand and gravel or crushed stone. They are used as filler or bulk to extend concrete volume, as well as provide durability and strength properties. The aggregate characteristics which contribute to these properties and the overall quality of any resulting concrete composition are well known to those skilled in the art and can be applied with equal effect to the present invention. Typically, as well known to those skilled in the art, a concrete composition will consist of about 70–85 and preferably about 75 weight percent aggregate, the relative amounts of and size gradations as chosen to maximize aggregate content and concrete economy. The requirements for grading and quality of fine and coarse aggregate for use in concrete are as provided in ASTM standard specification C 33, as provided in the *Annual Book of ASTM Standards*, Vol. 4.01, incorporated herein by reference in its entirety. Mortar compositions prepared with sand as the predominant aggregate material are not typically considered as concrete compositions under prevailing industry standards, but are nonetheless within the scope of this invention.

The chemical reactions characteristic to a cement material are initiated upon contact of its constituents with water. Hydration begins rapidly, giving off heat, before subsiding. However, as long as enough water is present in the cement/concrete, hydration will continue and the composition will achieve maximum strength. The rate of hydration is somewhat dependent upon the fineness of the cement. Higher fineness promotes a greater rate of hydration and earlier strength development.

Theoretically, cement requires a water/cement ratio of about 0.4 by weight to complete the requisite chemical reactions. However, depending upon the intended concrete use or application, a water/cement ratio of about 0.5 to about 0.7 is typically required to provide a workable composition in the absence of water-reducing agents. Generally, water/cement ratios within this range will be employed for concretes to be used in general construction. Lower water/cement ratios are often preferable where the resulting concrete material is to be in contact with water, subject to repeated freeze/thaw cycles, or used as an architectural design material. Of course, lower water/cement ratios are generally preferable.

For instance and without limitation, the following examples of this invention were prepared with consideration of the water/cement ratio. The water/cement ratio for all the mortar tests (C 109 Compressive Strength, C 185 Air Content, C 191 Vicat Setting Time, C 151 Autoclave Expansion and C 359 Mortar False Set) were established by the testing method. For C 109, the batches were as follows: 500 grams cement, 1375 grams sand, 242 ml water, or 740 grams cement, 2035 grams sand, 359 ml water (w/c=0.485). For C 191, 650 grams of cement were used, and the water/cement ratio was dictated by the results of the test for "Normal Consistency," ASTM C 187. This same water/cement ratio was used for the Autoclave Expansion Test (ASTM C 151). For the Air Content Test, 350 grams of cement and 1400 grams of standard sand were used, and the water content was that required to give approximately 87.5% flow on the flow table.

As described above in connection with the cementitious compositions of this invention, the concrete compositions can further include an interground functional addition material and/or a chemical admixture of the type specified in ASTM standard specifications C 688 and C 494. Such functional addition materials are those which are interground with clinker during manufacture/preparation of the cement and include those materials described above. Similar and/or equivalent materials can be used as chemical admixtures added to the cement/concrete. The amounts interground or admixed will vary, according to this invention, with the concentration of the oxidation product and/or the desired cement/concrete effect. In part, the concrete compositions of this invention contemplate the oxidation product as interground with the hydraulic cement material. It is also understood that the oxidation product can also be utilized as an admixture to the cement material. In the latter situation, the cement material preferably has chemical and physical properties as specified in ASTM C 150 standard specification for Type I portland cement and the oxidation product is present in the range of about 1.0 to 3.0 percent by weight. Alternatively, in preferred admixture embodiments of such concrete compositions, the cement material has chemical and physical properties as specified in ASTM C 150 for Type V portland cement and the oxidation product is present in the range of about 1.0 to 5.0 percent by weight. In certain other preferred admixture embodiments of such concrete compositions, the cement material has chemical and physical properties specified in ASTM C 150 for Type II portland cement and the oxidation product is present in the range of about 1.0 to about 3.0 percent by weight. In certain preferred embodiments, including but not limited to those where the cement material is or is equivalent to a Type I portland cement, the concrete compositions of this invention can further include a material comprising a Group IIA halide, hydroxide and/or carbonate. Such materials can be incorporated into the concrete composition in amounts less than those which are associated with deterioration of the salient concrete properties and can further include various concentrations of other Group IIA and Group IA compounds.

In part, the present invention contemplates a cementitious composition including (1) from about 0.05 to about 4 percent by weight magnesium sulfate, and (2) a hydraulic silicate cement material depending on the $SO_3$ content of the cement. For instance, where a cement has a reduced $SO_3$ concentration, a higher magnesium sulfate concentration could be used for appropriate compensation. While various hydraulic silicate cement materials can be used to prepare these particular cementitious compositions, portland cements have been used with good effect. As described more fully above, the physical and chemical parameters of the various portland cements which can be used in conjunction with this cementitious composition are as provided in ASTM standard specification C 150, in particular, the Type I, Type II and Type V portland cements. In highly preferred embodiments, the cement material has chemical and physical properties equivalent to or as specified in ASTM C 150 for Type I portland cement and, alternatively, the magnesium sulfate is present in the range of from about 0.2 to about 2 per cent by weight as an admixture to the cement material.

The use of magnesium sulfate in the manner disclosed herein is contrary to the art. Conventional wisdom dictates that the same material attacks calcium hydroxide crystals and hydrated calcium aluminate or sulfoaluminate of the hydrated cement, with deleterious effects. Without limitation to any one theory or mode of operation, it is thought that use of magnesium sulfate at amounts disclosed herein functions either alone or synergistically to enhance compressive strength.

In part, the present invention is a method which includes incorporation of at least about 0.1 percent by weight of a solid oxidation product of an aqueous emulsion of a naturally occurring asphalt from the Orinoco Belt of Venezuela to which has been added from about 100 to about 1500 ppm by weight of magnesium (measured as elemental magnesium), to prepare a cementitious composition. In preferred embodiments of the inventive method, the oxidation product is about 5.0 to about 12.0 weight percent of a calcium sulfate set control agent and, alternatively, is interground with a clinker material. In various other embodiments, about 0.1 to about 7.5 percent by weight of the oxidation product is admixed with a hydraulic silicate cement material, in which case the cement material can have physical and chemical properties meeting or equivalent to the ASTM C 150 standard specifications for Type I, Type II and Type V portland cements as well as chemical and physical properties meeting ASTM C 595 and/or 1157 standard specifications for blended hydraulic cements. Whether the oxidation product is part of a set control agent or admixed with a hydraulic cement material, the methods of this invention as expressed or inferred herein further include adding an aggregate material in a manner similar to or meeting the parameters described above.

EXAMPLES OF THE INVENTION

The following nonlimiting examples and data illustrate various aspects and features relating to the compositions and/or methods of this invention, including the utility of inventive cements, mortars and concretes.

Example 1

Finely pulverized or powdered magnesium sulfate, per se, and/or the oxidation products of this example are incorporated into the indicated cement material as either an addition (a) to the cement or a replacement therefor. No additional grinding was performed. Each addition or replacement was added to the mix at the same time as the cement. While this example considers use of magnesium sulfate and such oxidation products as admixtures to a cement material, the same magnesium-containing oxidation products can be used with equal effect—as would be understood by those of skill in the art—interground with a cement material.

Mixing times for all the physical tests cited are specified in the aforementioned ASTM methods. For the C 109 strength test, place the dry paddle and the dry bowl in the mixing position in the mixer, then introduce the materials for a batch into the bowl and mix in the following manner: 1) Place all the mixing water in the bowl. 2) Add the cement to the water; then start the mixer and mix at the slow speed (140±5 rev/min) for 30 seconds. 3) Add the entire quantity of sand slowly over a 30-sec period, while mixing at slow speed. 4) Stop the mixer, change to medium speed (285±10 rev/min), and mix for 30 sec. 5) Stop the mixer and let the mortar stand for 1½ minutes. During the first 15 sec of this interval, quickly scrape down into the batch any mortar that may have collected on the side of the bowl; then for the remainder of this interval, cover the bowl with the lid. 6) Finish by mixing for 1 min at medium speed (285±10 rev/min). 7) In any case requiring a remixing interval, any mortar adhering to the side of the bowl shall be quickly scraped down into the batch with the scraper prior to remixing.

For the C 185 Air Content Test, the mixing procedure is substantially the same as for the C 109 strength test.

For the C 191 Vicat Set Time and the C 151 Autoclave Expansion Tests, place the dry paddle and the dry bowl in the mixing position in the mixer, then introduce the materials for a batch into the bowl and mix in the following manner: 1) Place all the mixing water in the bowl. 2) Add the cement to the water and allow 30 sec for the absorption of the water. 3) Start the mixer and mix at the slow speed (140±5 rev/min) for 30 sec. 4) Stop the mixer for 15 sec and during this time scrape down into the batch any paste that may have collected on the sides of the bowl. Start the mixer at medium speed (285±10 rev/min), and mix for 1 min.

For the C 359 Mortar False Set Test,: mix at one time 600 g of cement, 300 g of graded standard sand, 300 g of 20–30 standard sand, and 180 ml of water for all cements except Types III and IIIA, for which the amount of water shall be 192 ml. The mixing shall be done in the mechanical mixer as follows: 1) Place the sand and the cement in the dry bowl, and mix the dry materials for a few seconds with the spoon. 2) Place the bowl in the mixer, set the paddle in place, and mix the dry materials for 10 sec at slow speed (140±5 rev/min). 3) With the mixer operating at slow speed, add the entire quantity of mixing water within 5 sec. Stop the mixer, quickly change to a medium speed (285±10 rev/min), and continue the mixing for 1 min, timing from the first addition of water. 4) Stop the mixer, scrape the sides of the mixing bowl with the rubber scraper, and quickly place the thermometer in the mortar. Allow it to stand undisturbed for the remainder of a 45-sec interval from the time of stopping the mixer. 5) Read the temperature, remove the thermometer, start the mixer, and mix for 15 sec at a medium speed. If the mortar temperature is not in the range from 23°±1.7° C. (73.4°±3° F.), discard the batch and adjust the temperature of the water or sand, or both, to give the required temperature.

Immediately after the particular mixing described for each test, 1) remove the bowl from the mixer and with a spoon, uniformly distribute a portion of the mortar into the container until the container is heaping full. Quickly and gently place each spoonful of mortar in the container. When removing the mortar from the bowl, do not remove the material pushed up on the side of the bowl by the paddle. After the container has been filled, reassembled the mixer, cover the bowl with a lid, and retain the remaining mortar for a remix test to be performed later. To compact the mortar in the container, lift the container approximately 80 mm (3 in) from the table with both hands and rap it twice against the surface of the table. 2) With the leading edge slightly raised, strike off the mortar with one stroke of the trowel along the length of the container. Then remove the excess mortar by means of a sawing motion with the straightedge of the trowel along the length of the container in a direction opposite to that used in striking off. Then, smooth the surface of the mortar with a single stroke of the trowel.

Figure 1:
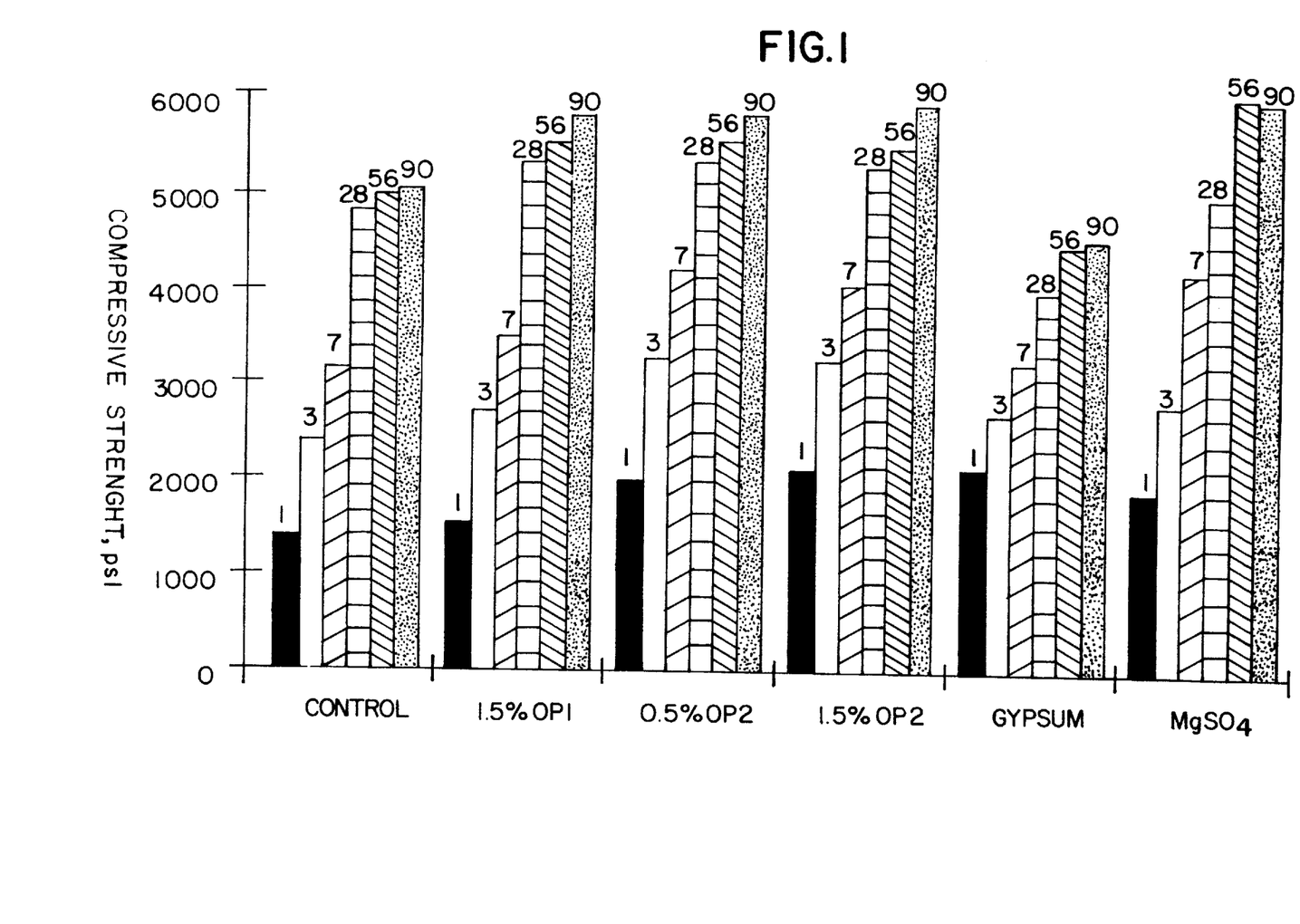
FIG. 1 graphically illustrates the compressive strengths determined for concretes prepared with Type I portland cement and the indicated oxidation product at 1, 3, 7, 28, 56 and 90 days of hydration, in accordance with this invention and as further described in Example 2, below.

For completion of the mortar false set test, 1) after filling the container, immediately place the 10-mm plunger of the Vicat apparatus, FIG. 1 of Test Method C 187, in contact with the surface of the mortar at the midpoint of the container on the longitudinal center line. Set the movable indicator at zero. Release the plunger 3 minutes after the beginning of the wet mixing and record the initial penetration in millimeters to which the plunger has settled below the surface 10 sec after being released. Generally, the plunger will settle to the bottom of the container, and the initial penetration will, accordingly, be recorded as 50+ mm. 2) Immediately withdraw and clean the plunger. In a similar manner, determine, after moving the Vicat apparatus to the desired location, the penetrations at intervals of 5, 8, and 11 min after the beginning of mixing. Do not move the filled container until these measurements are completed. Make all penetrations along the longitudinal center line of the container. Obtain 5- and 8-min penetrations at a distance of approximately 40 mm (1½ in.) from each end of the container, respectively, and determine the 11-min penetration at a point approximately midway between the points at which the initial and 5-min penetrations were determined. 3) At the completion of the measurement of the 11-min penetration, immediately return the mortar in the container to the bowl. Start the mixer, raise the bowl into mixing position, and remix the contents of the bowl at medium speed (285±10 rev/min) for 1 min. Fill a clean container as outlined above, and determine the penetration 45 sec after completion of mixing.

TABLE 1a

Compressive Strength of Cements

| Cement | | Compressive Strength, psi (days of hydration) | | | |
|---|---|---|---|---|---|
| Type | Additive (wt. %) | 1 | 3 | 7 | 28 |
| I | Control | 2000 | 3530 | 4760 | 6180 |
|  | 3% OP 1 | 1390 | 4070 | 5180 | 6230 |
|  | 5% OP 1 | — | 3140 | 4590 | 5780 |
|  | 10% OP 1 | — | 1240 | 1650 | 2010 |
| a | 0.5% OP 2 | 1720 | 3640 | 3830 | 5540 |
|  | 0.5% OP 2 | 2125 | 3825 | 4750 | 6250 |
| a | 1.5% OP 2 | 2030 | 2830 | 4630 | 6430 |
|  | 1.5% OP 2 | 2110 | 3720 | 4710 | 5880 |
|  | 0.35% MgSO$_4$ | 2250 | 3600 | 5350 | 6475 |
| II | Control | 1880 | 3480 | 4380 | 5530 |
|  | 2% OP 1 | 510 | 2490 | 3920 | 4210 |
| V | Control | 1430 | 2510 | 3270 | 5280 |
|  | 3% OP 1 | 100 | 2340 | 3210 | 5310 |
|  | 5% OP 1 | — | 2210 | 3390 | 5430 |
|  | 5% OP 1** | 150 | 1110 | 1930 | 3700 |
|  | 10% OP 1 | — | 780 | 1160 | 1880 |
| IP | Control | 1670 | 3190 | 4070 | 5000 |
|  | 1% OP 1 | 1360 | 3100 | 3790 | 5340 | a = addition. Other values shown refer to replacement of cement with mineral admixture.
**Guaged with additional water to same flowability as Type V Control TABLE 1b Relative Compressive Strength of Cements

| Cement | | Percent of Control (days of hydration) | | | |
|---|---|---|---|---|---|
| Type | Additive (wt. %) | 1 | 3 | 7 | 28 |
| I | Control | 100 | 100 | 100 | 100 |
|  | 3% OP 1 | 70 | 115 | 109 | 101 |
|  | 5% OP 1 | — | 89 | 96 | 94 |
|  | 10% OP 1 | — | 103 | 80 | 90 |
| a | 0.5% OP 2 | 86 | 103 | 80 | 90 |
|  | 0.5% OP 2 | 106 | 108 | 100 | 101 |
| a | 1.5% OP 2 | 102 | 80 | 97 | 104 |
|  | 1.5% OP 2 | 106 | 105 | 99 | 95 |
|  | 0.35% MgSO$_4$ | 113 | 102 | 112 | 105 |
| II | Control | 100 | 100 | 100 | 100 |
|  | 3% OP 1 | 27 | 72 | 89 | 76 |
| V | Control | 100 | 100 | 100 | 100 |
|  | 3% OP 1 | 7 | 93 | 98 | 101 |
|  | 5% OP 1 | — | 88 | 104 | 103 |
|  | 5% OP 1** | — | 44 | 59 | 70 |
|  | 10% OP 1 | — | 31 | 35 | 36 |
| IP | Control | 100 | 100 | 100 | 100 |
|  | 1% OP 1 | 81 | 97 | 93 | 107 | a = addition. Other values shown refer to replacement of cement with mineral admixture.
*Guaged with additional water to same flowability as Type V Control TABLE 1c Mortar False Set (ASTM C 359)

| Cement | | mm Penetration | | | | |
|---|---|---|---|---|---|---|
| Type | Additive (wt. %) | Initial | 5-min. | 8-min. | 11-min. | Remix |
| I | Control | 22 | 12 | 9 | 10 | 13 |
|  | 3% OP 1 | 17.5 | 4 | 2.5 | 2 | 33.5 |
|  | 0.5% OP 2 | 20 | 14 | 9 | 6 | 10 |
|  | 0.35% MgSO$_4$ | 10 | 5 | 5 | 4 | 4 |
| II | Control | 44 | 17.5 | 10 | 7 | 39 |
|  | 1.5% OP 1 | 50 | 48 | 45 | 28 | 50 |
| V | Control | 50 | 48 | 44 | 33 | 50 |
|  | 3% OP 1 | 50 | 48 | 45 | 28 | 50 |
| IP | Control | 4 | 1 | 0.5 | 0 | 50 |
|  | 1% added OP 1 | 50 | 4 | 1 | 1 | 50 |

TABLE 1d

Autoclave Expansion (ASTM C 151)
Expansion, % Length

| Cement Type | Additive (wt. %) | Expansion (% length) |
|---|---|---|
| I | Control | 0.055 |
|  | 3% OP 1 | 0.014 |
| II | Control | 0.03 |
|  | 1.5 % OP 1 | −0.01 |
| V | Control | 0.002 |
|  | 3% OP 1 | −0.049 |
| IP | Control | −0.085 |
|  | 1% OP 1 | −0.101 |

TABLE 1e

Mortar Air Contents (ASTM C 185)
% By Vol.

| Cement Type | Additive (wt. %) | % by Vol. |
|---|---|---|
| I | Control | 9.9 |
|  | w/3% OP 1 | 9.0 |

TABLE 1e-continued

Mortar Air Contents (ASTM C 185)
% By Vol.

| Cement Type | Additive (wt. %) | % by Vol. |
|---|---|---|
| a | 0.5% OP 2 | 7.7 |
|   | 0.5% OP 2 | 8.2 |
| a | 1.5% OP 2 | 7.2 |
|   | 1.5% OP 2 | 7.3 |
| II | Control | 7.3 |
|   | 1.5% OP 1 | 3.9 |
| V | Control | 8.8 |
|   | 3% OP 1 | 7.1 |
| IP | Control | 4.5 |
|   | 1% OP 1 | 4.3 |

TABLE 1f

Time of Set
VICAT, ASTM C 191

| Cement Type | Additive (wt. %) | Init., Hr.:Min. | Final, Hr.:Min. |
|---|---|---|---|
| I | Control | 2:46 | 4:15 |
|   | 3% OP 1 | 6:30 | 10:00 |
| a | 0.5% OP 2 | 3.18 | 5.00 |
|   | 0.5% OP 2 | 3:30 | 4:15 |
| a | 1.5% OP 2 | 3:45 | 5:00 |
|   | 1.5% OP 2 | 3:46 | 6:00 |
|   | 0.35% $MgSO_4$ | 2:29 | 4:15 |
| II | Control | 2:44 | 4:15 |
|   | 2% OP 1 | 6:51 | >8:00 |
| V | Control | 2:58 | 4:45 |
|   | 3% OP 1 | 10:00 | 12:15 |
| IP | Control | 2:29 | 4:45 |
|   | 1% OP 1 | 4:59 | 6:45 |

Using the procedures and methods described above, the compressive strengths for various mortars are shown in Table 1a, as prepared from the indicated cement types and oxidation products indicated. The mortar specimens were compared to a cement control which is manufactured with a commercially-available gypsum. For purposes of comparison and to demonstrate the utility of the present invention, the control cement was augmented separately with magnesium sulfate and an oxidation product of this invention, at the weight percents shown. Additives OP 1 (100% oxidation product) and OP 2 (60% oxidation product) are commercially available from Pure Air, a division of Air Products and Chemicals, Inc. under the PCS trademark. Several specimens were also prepared using the indicated weight percent of magnesium sulfate, also in accordance with this invention.

As seen in the Type I cement specimens, the difference was observed in the resulting mortar compressive strengths, depending upon whether the additive was introduced as a replacement or as an addition. At 0.5 weight percent, OP 2 gave generally lower compressive strengths when used in addition, as compared to the same additive used as a replacement. In contrast, at 1.5 weight percent, OP 2 demonstrated a higher compressive strength after 28 days when used in addition, as compared to the same additive used as a replacement. The excellent results observed with magnesium sulfate are surprising and unexpected. Once made aware of this invention, those of skill in the art will find this addition to be useful over the ranges disclosed herein. The results of Table 1a are presented as percentages of the control compressive strengths, as displayed in Table 1b.

With reference to Table 1c, the Type I and Type II mortars prepared exhibited a moderate early stiffening behavior, which was neither appreciably corrected nor worsened by the presence of an oxidation product. The Type V control specimen behaved normally in the early stiffening evaluations and was not adversely affected by the presence of oxidation product. With reference to Table 1e, none of the oxidation product additives were observed to significantly affect air entrainment. The apparent slight reduction in entrained air would not be considered statistically significant.

With reference to Table 1d, in all instances incorporation of an oxidation product did not induce expansion beyond the limit specified in the applicable ASTM standards specification. Indeed, in some instances, expansions decreased upon introduction of the inventive oxidation product.

With reference to Table 1f, incorporation of an oxidation product additive with Type I cement resulted in some retardation, as shown most dramatically with 3% OP 1. Lesser concentrations of OP 2 reduced the degree of observed retardation. It was observed, however, that the mixes prepared with OP 2 were quite dry, suggesting the use of one of several commercially-available superplasticizers, of the type disclosed herein, to counteract this phenomenon. Use of such materials with the oxidation product of this invention would be expected to provide cement/concrete products with enhanced strengths and good workability, without excessively long setting times. Such embodiments are within the scope of this invention. In particular, initial evaluations of a naphthalene sulfonate superplasticizer was found to restore the flowability to mortar including 1.5% OP 2. A representative effective dosage was found to be 17% of the superplasticizer to 83% of such an oxidation product—modified mixture. Other dosage rates for this plasticizer as well as those for other comparable plasticizers will be dependent upon the particular cement and/or oxidation product utilized. Again, with reference to Table 1f, use of the indicated concentration of magnesium sulfate does not appear to retard set, as compared to the control.

Example 2

In part, the results of studies on the cement compositions of Example 1 were extended to Type I cement in concrete. As a practical matter mortar strengths for cement do not always directly lead to the strengths observed for the corresponding concrete. Furthermore, concrete is the actual material sold for construction purposes.

The concrete of this example was prepared as follows. The oxidation products indicated were added to the mix at the same time as the cement. No additional grinding was required. Using a 1.75 cubic foot Lancaster pan mixer, for each concrete/specimen batch, the mixer was charged with the coarse aggregate first, then the fine aggregate. The mixer was rotated a few turns to mix these ingredients, then turned off, momentarily. The mixer was turned back on. While it was rotating, the cement, oxidation product and/or $MgSO_4$, and some of the water were added to the mixer. The remainder of the water was added to the mixer while it continued to rotate. After all ingredients were in the mixer, the concrete was mixed for three minutes, followed by a three-minute rest during which the mix was covered with a plastic sheet, followed by a two-minute final mix. The plastic sheet was removed when the mixer was restarted. The mixer was stopped and specimens were prepared.

Figure 2:
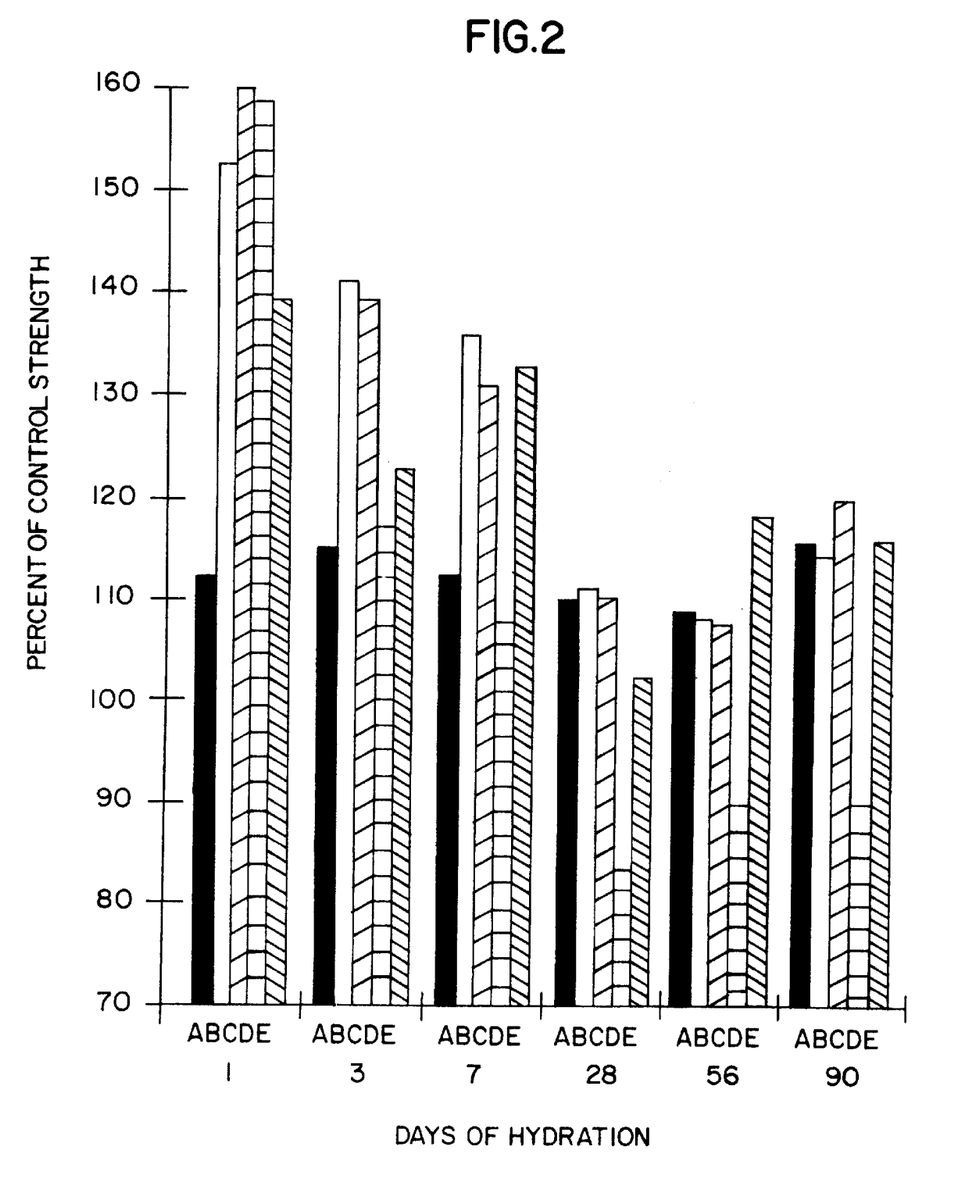
FIG. 2 extends the graphics of FIG. 1 by expressing the absolute strengths as percentages of the control strength at the indicated days of hydration, and as further described in Example 2, below—A is 1.5% of OP 1, B is 0.5% of OP 2, C is 1.5% of OP 2, D is a gypsum, and E is $MgSO_4$.

With reference to FIGS. 1 and 2, illustrating the absolute and relative compressive strength values determined for the indicated concrete specimens, respectively, a number of observations can be made. The inventive oxidation product, of which OP 1 and OP 2 are representative, enhance strength development of this Type I cement in concrete at all ages when incorporated as an admixture. Early strengths appear to be enhanced more by OP 2 than OP 1. The results designated with the term "GYPSUM" were obtained on a laboratory grind of Type I clinker with a commercially available gypsum material modified to include one or more of the oxidation products of this invention. As seen in FIG. 1 and FIG. 2, the compressive strengths at later stages of hydration were reduced.

Example 3

Cementitious compositions are prepared in the manner described above, but employing the blow down solids from the aqueous scrubbing of flue gas as the source of magnesium sulfate. A typical analysis of such mixture is set forth in Table 3, below.

TABLE 3

| Material | Concentration, wt. % |
| --- | --- |
| $MgSO_4 \cdot H_2O$ | 56 |
| $Ca_2SO_4$ | 12 |
| NaCl | 11.7 |
| $Al(OH)_3$ | 7.6 |
| $Fe(OH)_3$ | 5.0 |
| $Na_2SO_4$ | 4.8 |
| KCl | 2.9 |

Several batches of cementitious compositions meeting the specifications set forth for ASTM C 150 Type I cement are prepared using various concentrations of the solids mixture ranging from about 0.25 to about 1 per cent by weight and including compositions prepared using combinations of the solid mixtures together with other sources of magnesium sulfate, including blends with the above described oxidation products, in proportions ranging from about 5 to about 45 per cent by weight solid mixture, with the balance being the above described oxidation products. Similarly, the solid mixture is blended with commercial grade magnesium sulfate, with the solid mixture being present in an amount of about 10 to about 50 per cent by weight of the blend.

The results obtained with these batches are equivalent to the results shown above in Examples 1 and 2.

While the principles of this invention have been described in connection with specific embodiments, it should be understood clearly that these descriptions, along with the chosen tables and data therein, are made only by way of example and are not intended to limit the scope of this invention in any manner. Other advantages and features of the invention will become apparent from the following claims, with the scope thereof determined by the reasonable equivalents, as understood by those skilled in the art.

What is claimed is:

1. A cementitious composition, comprising:
   from about 0.1 to about 7.5 per cent by weight of a solid residual oxidation product from the combustion of an aqueous emulsion of a naturally occurring asphalt from the Orinoco Belt of Venezuela which contains from about 100 to about 1500 ppm by weight magnesium in the form of a water soluble magnesium salt, which product from the combustion contains magnesium sulfate present in the amount of from about 0.05 to about 4 per cent by weight of the cementitious composition; and
   from about 92.5 to about 99.95 per cent by weight of a hydraulic silicate cement material.

2. The composition of claim 1 which also contains a mixture of the halides, hydroxides, carbonates and sulfates of Group IA metals and Group IIA metals.

3. The composition of claim 2 wherein mixture is derived from the wastewater stream from an aqueous scrubber of a combustion flue gas.

4. The composition of claim 1 wherein unoxidized carbon in the solid oxidation product is less than about 4 per cent by weight.

5. The composition of claim 1 wherein the oxidation product is present in the range from about 0.5 to about 5.0 percent by weight.

6. The composition of claim 1 wherein the cement material further includes an air entraining agent.

7. The composition of claim 1 wherein the cement material further includes at least one of an interground functional addition material and a chemical admixture.

8. The composition of claim 1 wherein the oxidation product is an admixture to the cement material.

9. The composition of claim 1 wherein the cement material has chemical and physical properties specified in ASTM C 150 for Type I portland cement and the oxidation product is present in the range of about 1.0 to about 3.0 percent by weight.

10. The composition of claim 1 wherein the cement material has chemical and physical properties specified in ASTM C 150 for Type V portland cement and the oxidation product is present in the range of about 1.0 to about 5.0 percent by weight.

11. The composition of claim 1 wherein the cement material has properties specified in at least one of ASTM C 595 and ASTM C 1157 for Type IP portland-pozzolan cement and the oxidation product is present in the range of about 1.0 to about 3.0 percent by weight.

12. The composition of claim 1 further including aggregate.

13. A hydrated cementitious concrete composition, comprising:
   a cementitious composition comprising:
      from about 92.5 to about 99.9 per cent by weight of a hydraulic silicate cement material; and
      from about 0.1 to about 7.5 per cent by weight of a solid residual oxidation product from the combustion of an aqueous emulsion of a naturally occurring asphalt from the Orinoco Belt of Venezuela and containing from about 100 to about 1500 ppm by weight magnesium in the form of a water soluble magnesium salt, which product from the combustion contains magnesium sulfate present in the amount of from about 0.05 to about 4 per cent by weight of the cementitious composition:
      an aggregate material; and
   water in an amount sufficient to hydrate the cementitious composition.

14. The concrete composition of claim 13 wherein the oxidation product is present in the range from about 0.25 to about 1 percent by weight.

15. The concrete composition of claim 13 wherein the cement material further includes at least one of an air entraining agent, an interground functional addition material, and a chemical admixture.

16. The concrete composition of claim 13 wherein the oxidation product is an admixture to the cement material.

17. The concrete composition of claim 16 wherein the cement material has chemical and physical properties specified in ASTM C 150 for Type I portland cement and the oxidation product is present in the range of about 1.0 to about 3.0 percent by weight.

18. The concrete composition of claim 16 wherein the cement material has chemical and physical properties specified in ASTM C 150 for Type V portland cement and the oxidation product is present in the range of about 1.0 to about 5.0 percent by weight.

19. The concrete composition of claim 16 wherein the cement material has chemical and physical properties specified in ASTM C 150 for Type II portland cement and the oxidation product is present in the range of about 0.25 to about 1 percent by weight.

20. The concrete composition of claim 17 further including an additive material selected from the group consisting of the halides, hydroxides, carbonates and sulfates of Group IA metals and Group IIA metals.

21. The composition of claim 20 wherein the additive material is derived from the wastewater stream from an aqueous scrubber of a combustion flue gas.

22. The concrete composition of claim 13 further including a material comprising a mixture of the halides, hydroxides, carbonates and sulfates of Group IA metals and Group IIA metals.

23. The concrete composition of claim 13 wherein the aggregate material is present in the range from about 70.0 to about 85.0 percent by weight of the composition and selected from the group consisting of coarse aggregate, fine aggregate and combinations thereof.

24. A method comprising incorporating from about 0.1 to about 7.5 per cent by weight of a solid residual oxidation product from the combustion of a naturally occurring asphalt from the Orinoco Belt of Venezuela containing from about 100 to about 1500 ppm by weight magnesium in the form of a water soluble magnesium salt, which product from the combustion contains magnesium sulfate in the amount of from about 0.05 to about 4 per cent by weight of the total composition, into a hydraulic silicate cement present in the amount of from about 92.5 to about 99.9 per cent by weight.

* * * * *